(12) United States Patent
Flynn et al.

(10) Patent No.: US 7,143,017 B2
(45) Date of Patent: Nov. 28, 2006

(54) REMOTE CONTROL LOCOMOTIVE SIMULATOR

(75) Inventors: Danny D. Flynn, Fort Worth, TX (US); C. Mackay Foster, Burleson, TX (US); Michael J. Hawthorne, Arlington, TX (US)

(73) Assignee: New York Air Brake Corporation, Watertown, NY (US)

( * ) Notice: Subject to any disclaimer, the term of this patent is extended or adjusted under 35 U.S.C. 154(b) by 757 days.

(21) Appl. No.: 10/178,730

(22) Filed: Jun. 25, 2002

(65) Prior Publication Data

US 2003/0236654 A1 Dec. 25, 2003

(51) Int. Cl.
*G06G 7/48* (2006.01)
*G09B 9/02* (2006.01)

(52) U.S. Cl. .......................................... 703/6; 434/29

(58) Field of Classification Search ................ 701/19, 701/20; 703/8, 3, 6; 434/29
See application file for complete search history.

(56) References Cited

U.S. PATENT DOCUMENTS

| | | | |
|---|---|---|---|
| 3,839,822 A * | 10/1974 | Rexford ..................... | 446/410 |
| 3,885,324 A | 1/1975 | Davenport et al. ........... | 434/66 |
| 3,957,236 A | 5/1976 | Phelps et al. ............. | 246/187 B |
| 4,041,283 A * | 8/1977 | Mosier ...................... | 701/20 |
| 4,042,810 A | 8/1977 | Mosher ...................... | 701/19 |
| 4,174,833 A * | 11/1979 | Hennig et al. .............. | 273/442 |
| 4,181,943 A | 1/1980 | Mercer, Sr. et al. ......... | 701/20 |
| 4,236,215 A | 11/1980 | Callahan et al. ............ | 701/35 |
| 4,301,899 A | 11/1981 | McSparran et al. ........... | 191/3 |
| 4,344,364 A | 8/1982 | Nickles et al. ............. | 105/62.1 |
| 4,474,372 A * | 10/1984 | Karasawa ................... | 273/442 |
| 4,602,335 A | 7/1986 | Perlmutter ................. | 701/20 |
| 4,735,385 A | 4/1988 | Nickles et al. ........... | 246/182 B |
| 4,750,888 A | 6/1988 | Allard et al. ............. | 434/69 |
| 4,827,438 A | 5/1989 | Nickles et al. ............ | 703/8 |
| 4,853,883 A | 8/1989 | Nickles et al. ............ | 703/8 |
| 4,952,152 A | 8/1990 | Briggs et al. ............. | 434/69 |
| 5,280,418 A | 1/1994 | Griffin ..................... | 363/34 |
| 5,354,202 A | 10/1994 | Moncrief et al. ........... | 434/69 |
| 5,368,484 A | 11/1994 | Copperman et al. .......... | 434/69 |
| 5,550,738 A | 8/1996 | Bailey et al. ............. | 455/456.5 |
| 5,685,507 A * | 11/1997 | Horst et al. .............. | 246/187 A |
| 5,744,707 A | 4/1998 | Kull ....................... | 73/121 |

(Continued)

FOREIGN PATENT DOCUMENTS

EP 0 114 633 A1 8/1984

(Continued)

OTHER PUBLICATIONS

Vantuono, William C., "A prize still out of reach", Railway Age, Feb. 2000.*

(Continued)

*Primary Examiner*—Paul Rodriguez
*Assistant Examiner*—Russ Guill
(74) *Attorney, Agent, or Firm*—Barnes & Thornburg LLP

(57) ABSTRACT

A remote control locomotive simulator including a display and a first input device similar to a remote control locomotive controller to be operated by the operator to provide train signals. A computer drives the display to move a train relative to a track in response to the train signals. A remote control locomotive controller may be an actual remote control locomotive system or may be a virtual remote control locomotive controller where the input device is one or more of a keyboard, a mouse or a touch screen of the computer. Data associated with a simulator session of this device is recorded and made available for real-time or post-processing analysis including visual review of train management using the included computer generated graphics system.

27 Claims, 3 Drawing Sheets

U.S. PATENT DOCUMENTS

| | | | | |
|---|---|---|---|---|
| 5,758,299 | A | | 5/1998 | Sandborg et al. ............. 701/29 |
| 5,893,893 | A | | 4/1999 | Holt et al. .................... 701/35 |
| 6,144,901 | A | * | 11/2000 | Nickles et al. ................ 701/19 |
| 6,219,595 | B1 | | 4/2001 | Nickles et al. ................ 701/19 |
| 6,226,577 | B1 | | 5/2001 | Yeo ........................... 700/248 |
| 6,263,266 | B1 | | 7/2001 | Hawthorne ................. 701/19 |
| 6,369,952 | B1 | * | 4/2002 | Rallison et al. ............. 359/630 |
| 6,371,416 | B1 | | 4/2002 | Hawthorne ............. 246/122 R |
| 6,382,378 | B1 | | 5/2002 | Cornic .......................... 191/6 |
| 6,480,766 | B1 | | 11/2002 | Hawthorne et al. ........... 701/19 |
| 6,774,885 | B1 | * | 8/2004 | Even-Zohar ................ 345/156 |
| RE38,660 | E | * | 11/2004 | Novosel et al. ............. 704/272 |
| 2002/0183995 | A1 | | 12/2002 | Veitch et al. .................. 703/7 |

FOREIGN PATENT DOCUMENTS

| | | |
|---|---|---|
| EP | 0 257 662 A2 | 3/1988 |
| EP | 0 539 885 A2 | 5/1993 |
| EP | 0 755 840 A1 | 1/1997 |
| GB | 2 188 464 A | 9/1987 |
| WO | WO 90/03622 | 4/1990 |

OTHER PUBLICATIONS

Yano et al., "Shared Walk Environment Using Locomotion Intefaces", ACM Library Database, 2000.*

Ytuarte, C. (Feb. 2002): "Coming to your Class I: Remote control," Railway Age, pp. 15-16, 27.

Locomotive Engineers Journal (2000), "The issues: Remote control," available at http://www.ble.org/pr/journal/summer00/story8.html.

FRA Notice of Safety Advisory 2001-01, 66 Fed. Reg. 10,340 (Feb. 14, 2001).

Kube, K. (2001): "'They're just guidelines': Will FRA's remote control advisory be the benchmark railroads, rail labor need as they seek remote-related safety, productivity answers?," Progressive Railroading, pp. 44-47.

Vantuono, W.C. (2000): "A prize still out of reach," Railway Age, available at http://www.railwayage.com/feb00/remotecontrol.html.

"CANAC: Smaller BELTPACK®," available at http://www.rtands.com/mar01/ballast.html; http://www.qualitytoday.com/Oct-00-news/10250-4.htm; and http://members.attcanada.ca/~disf/rail.html.

Portable Radio Remote Controls (PRRC's) for Locomotive.

Orsillo, James. *Simulation Applications For the Digital Railroad*, ORTHSTAR, Inc. (Sep. 2002).

Transport Technology, IIT Research Institute (2002).

* cited by examiner

REMOTE CONTROL LOCOMOTIVE SIMULATOR

BACKGROUND AND SUMMARY OF THE INVENTION

The present invention relates to remote control locomotive systems and, more specifically, to a simulator for remote control locomotive systems.

A remote control locomotive system is a control of a locomotive from a location other than the locomotive cab. Remote control is generally from a mobile controller or remote control transmitter (RCT), known by one manufacturer as "beltpack," or from a console in the yard or tower. In response to industry pressure to issue guidelines, the Federal Railroad Administration published the Federal Register Safety Advisory 2000-1, Federal Register Vol. 66, No. 31, Feb. 14, 2001, presenting guidelines for remote control locomotive use. In addition to guidelines for operational safety and use of the device, training and certification of operators are also part of the guidelines.

The present invention addresses these needs by providing a simulator that can be used to train and certify operators, known as locomotive engineers, as well as to provide a simulation capable of testing the equipment. The simulator includes a display and a first input device similar to a remote control locomotive controller to be operated by the operator to provide train signals. A computer drives the display to move a train relative to a track in response to the train signals. A remote control locomotive controller may be an actual remote control locomotive system or a virtual remote control locomotive controller where the input device is one or more of a keyboard, a mouse or a touch screen of the computer. The remote control locomotive controller may be portable or a floor console.

The simulator may also include audio devices or a motion platform driven by the computer. A second input device may also be provided which senses one or more of position and orientation of the operator and provides view signals. The computer drives the display to change the perspective of the display in response to the view signals. The motion platform may also include a treadmill or large roller ball, allowing the operator to walk towards and away from the train or up and down the train. The audio and visual systems track and respond to the operator's position. A computer-generated images system may drive the display. The simulator can also simulate atmospheric conditions either by an atmospheric control system to physically subject the operator to atmospheric conditions and/or by modifying the drive signals for the display to simulate various atmospheric conditions.

The computer may also record the operator's commands for later analysis with correlated drive signals. The computer may also include pre-selected alert conditions and annunciates such conditions when they occur.

The instructor, in preparing for a training session, may develop a list of exceptions that will distinguish between a good, acceptable and poor operation of the remote control device. The instructor may also develop a grading criteria based on performance in order to derive a measure of proficiency of the operator. All pre-selected exceptions can be announced to the instructor and/or operator in real-time during the simulation session or after the session by way of playback. The system will also provide facilities to create and manage a database of operator performance and provide tools to organize both playback type data and result type data for future reference.

These and other aspects of the present invention will become apparent from the following detailed description of the invention, when considered in conjunction with accompanying drawings.

DETAILED DESCRIPTION OF THE PREFERRED EMBODIMENTS

Figure 1:
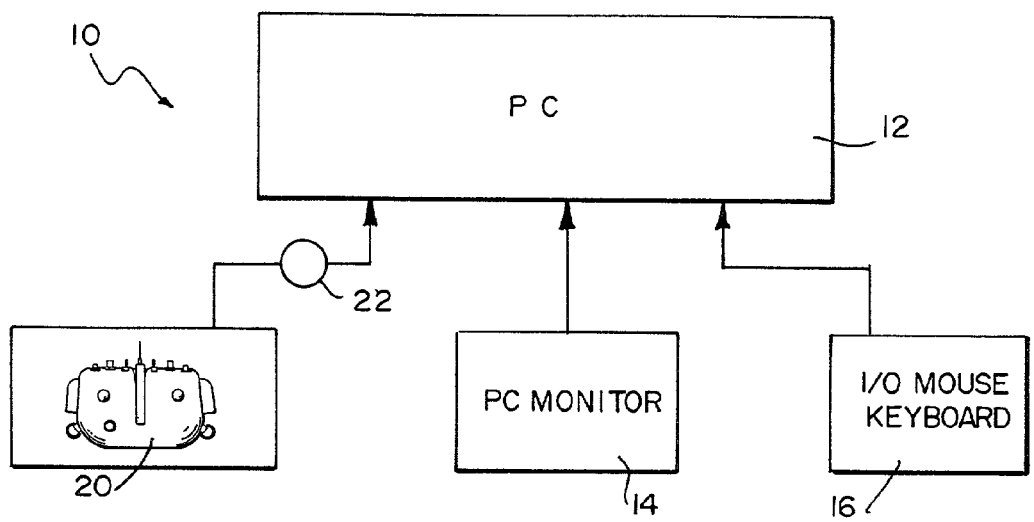
FIG. 1 is a block diagram of a simple simulator incorporating the principles of the present invention.

A simulator for a portable remote control locomotive system 10 is illustrated in FIG. 1. It includes a computer or PC 12 having a PC monitor 14 and an input/output device (I/O) 16, including a mouse or a keyboard. It may also include a touch-sensitive screen. A remote control locomotive (RCL) controller 20 communicates with the computer, PC or microprocessor 12 by a link 22. Link 22 may be a hardwire connection or may be other connections, including radio waves, light waves or sound waves.

Figure 2:
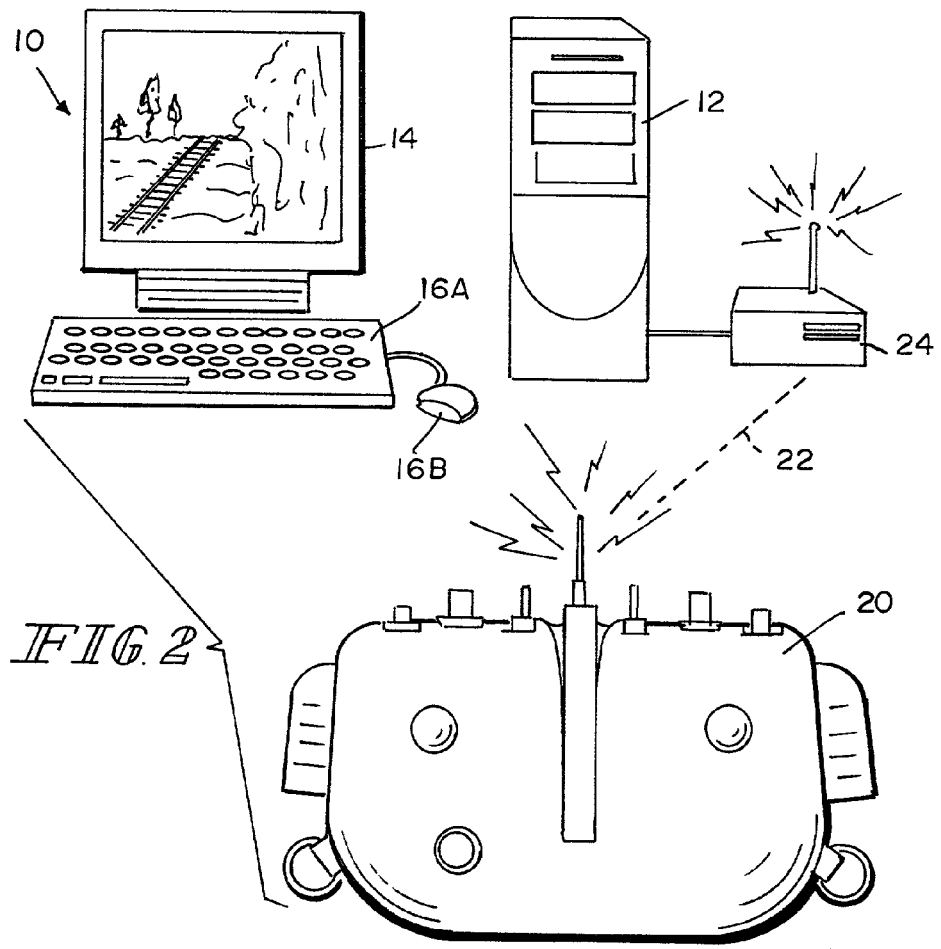
FIG. 2 shows an implementation of the simulator of FIG. 1.

A typical example is illustrated in FIG. 2, wherein the connection 22 is by radio waves and includes a transceiver 24 connecting the RCL controller 20 with the computer 12. An input device includes keyboard 16a and a mouse 16b. The computer 12 would include appropriate software, which would drive the display from a first database in response to train signals from the RCL controller 20. The software would interpret the signals coming from RCL controller 20 and provide drive signals to display 14 to move a train relative to the tracks. Different scenarios may be built in to the software in the computer 12 to test and measure the ability of the operator of the RCL controller 20. Results may be stored and analyzed later. They may be used in a certification or a further training program.

The instructor, in preparing for a training session, may develop list of exceptions that will distinguish between a good, acceptable and poor operation of the remote control locomotive system. The instructor may also develop a grading criteria based on performance in order to derive a measure of proficiency of the operator. All pre-selected exceptions can be announced to the instructor and/or operator in real-time during the simulation session or after the session by way of playback. The system will also provide facilities to create and manage a database of operator performance and provide tools to organize both playback type data and result type data for future reference.

Figure 3:
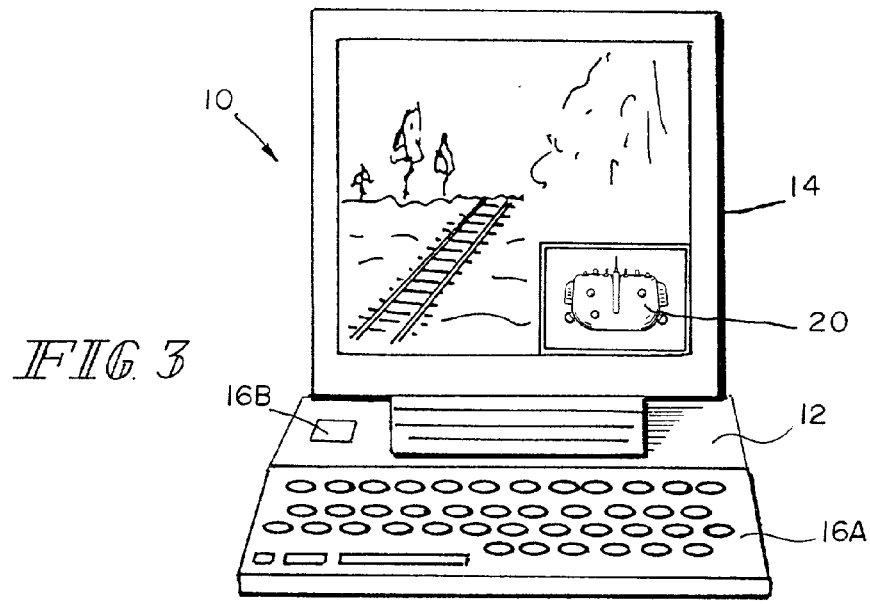
FIG. 3 shows an implementation of the simulator of FIG. 1 with a virtual remote control locomotive controller.

A simplified simulator 10 on a portable PC is illustrated in FIG. 3. The RCL controller 20 is shown on the screen as a virtual RCL controller. The touch screen or control input device is a mouse or keyboard and may be used to operate the RCL controller 20. While FIG. 2 shows a desktop version of the simulator, FIG. 3 shows a truly portable simulator.

Figure 4:
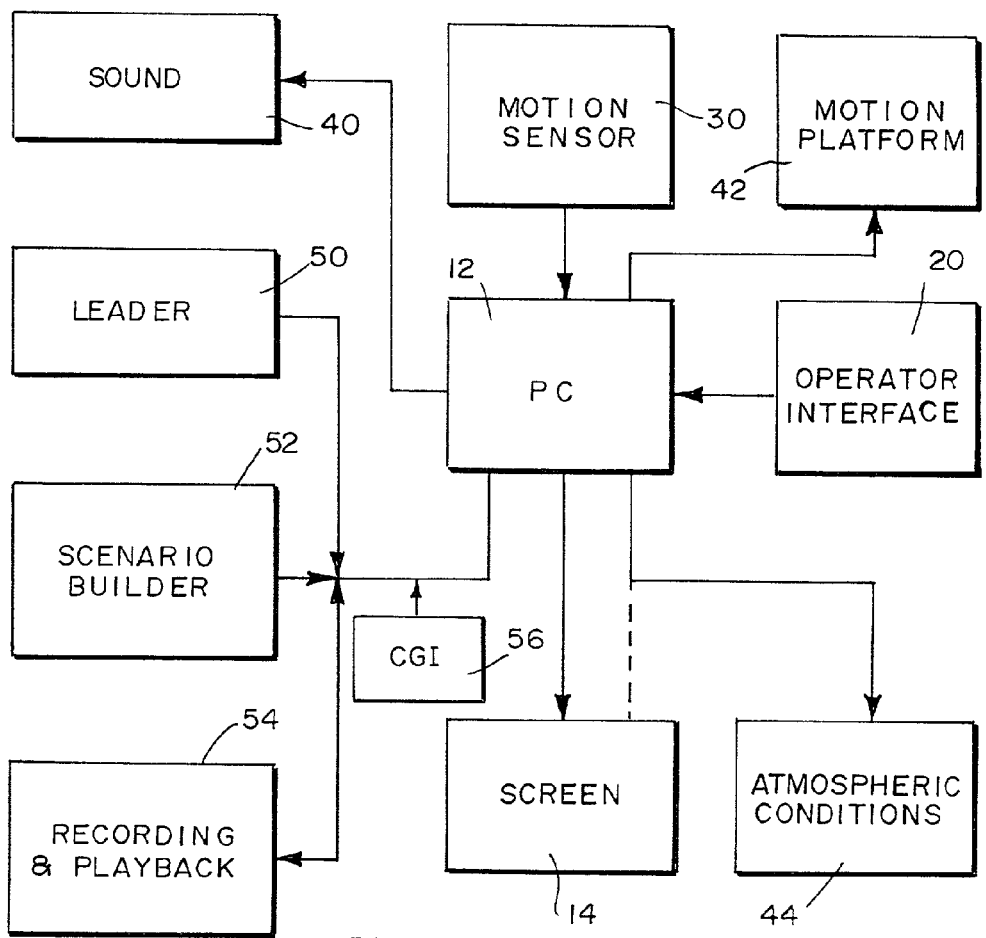
FIG. 4 is a block diagram of a more sophisticated simulator according to the principles of the present invention.
Figure 5:
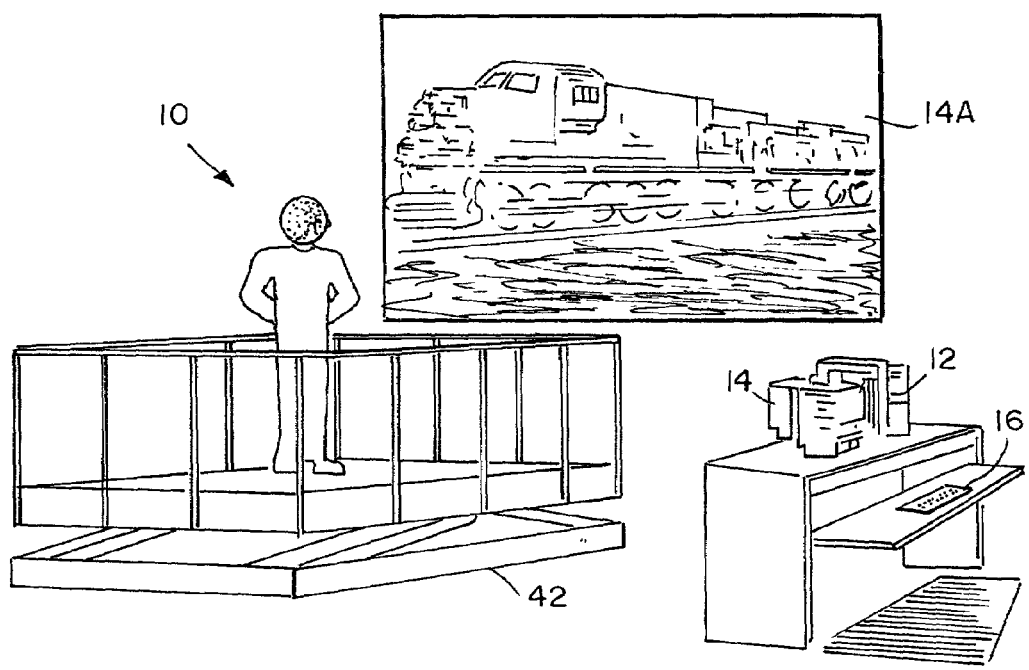
FIG. 5 shows an implementation of the block diagram of FIG. 4.
Figure 6:
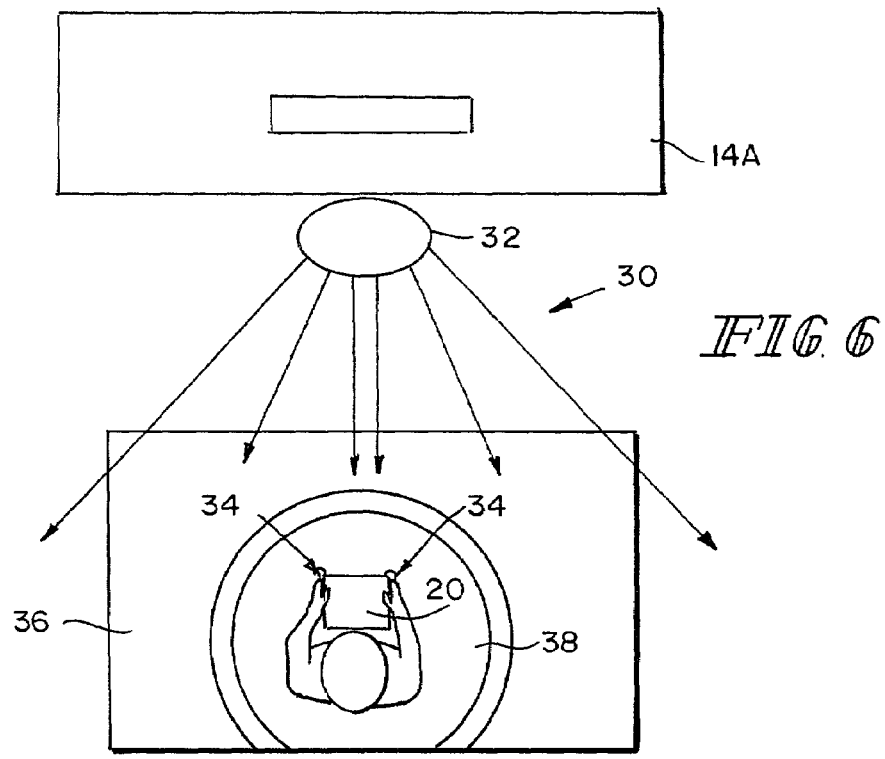
FIG. 6 shows a plane view of a position and/or orientation sensor and treadmill according to the principles of the present invention.

A more sophisticated simulator is illustrated in FIGS. 4 through 6. Those numbers which have common functions in FIGS. 1 through 3 are used in FIGS. 4 through 6. The computer 12 is connected to a screen 14 and has an operator interface 20. As illustrated in FIG. 5a, an enlarged screen display or an additional display 14a may be provided. The computer 12, screen 14 and the I/O device 16 is at a workstation, as illustrated in FIG. 5. This may also include an RCL controller 20 and would simulate a floor console RCL controller, as in a yard or tower.

The motion sensor 30 is a second input device which senses one or more of the position and orientation of the operator. This is used by the computer 12 as view signals or instructions for an image-generating program and drives the display to change the perspective of the display in response to the view signals. This is used in combination with the signals from the operator interface device or RCL controller 20 to change the position of the locomotive on the tracks and the perspective at which the entire environment is viewed.

Besides the visual display, the outputs may also drive a sound system 40 or a motion platform 42, upon which the operator stands, as illustrated in FIG. 5. The sound system 40 will provide sounds which are normally encountered in the field. These may include machine or train sounds, environmental sounds and/or sounds of people. The system could incorporate virtual people visually and/or audibly interacting with the student or operator to create more realism. The operator's response to these sounds are recorded and can be used later for evaluation. The response may be in the operation of the RCL, change of physical position or verbal response. An instructor may also make verbal inputs or commands, and they would also be recorded. Voice recognition software may also be used. The sound system 40 could be a surround sound system or headphones worn by the operator.

The motion platform 42 may include anything from a full-motion platform to one which allows the operator to feel the shakes and tremors in the ground that are normally felt by the operator working in the switch yard or next to the train. The platform 42 may also change to the elevation of the operator relative to the display 14 and/or the video system will calculate and re-display the perspective of visual environment for the operator using for example computer generated image (CGI) system 56. This would simulate the different positions from which the operator can use the RCL controller 20. Thus, they can operate it from the ground or from a position on the train. This will give operators a sense of height, as well as what is being shown on the display 14.

The simulator may also include in the computer 12 atmospheric conditions. These atmospheric conditions may provide a display drive signal to the display 14, which would illustrate different atmospheric conditions. These may include, for example, rain, fog, snow, reduced visibility, etc. For more reality, as well as being used in equipment testing, the simulator may include the ability to create atmospheric conditions 44. These atmospheric systems may be similar to those used at a sound stage, which again could produce rain, fog and reduced visibility. Reduced visibility may also be provided as signals to goggles worn by the operator and controlled by radio signals.

Other components that may be provided include a LEADER System, which would provide input information of the forces, brake pressure, speed, acceleration, etc., within the train that are produced by the operator's operation of the train to the computer 12 to provide it on display 14. This information may be stored in an event recorder 54 and made available for playback.

Another system is a scenario builder 52. This is a software tool that allows the customer or trainer to build up training scenarios that the trainee or operator will encounter in the field. The event recorder and playback system 54 not only records the information of the run including the selected conditions and the responses during the training session but can also provide the information back to the computer 12 to drive the display 14 to repeat previous training sessions.

The CGI system 56 of the simulator 10 is a three dimensional world wherein, the "eye point" or reference point can wander all over to see nearly any viewing angle within the bounds of the CGI database. The RCL simulator records data files representing student commands to the simulator system augment to include the state of the CGI database for each instant in time. Since the database remains constant (static), the data recorded would be the dynamic and augmented information about the state of the simulator session such as position, other vehicles or people and their position, weather, etc.

This is a powerful tool for training and review of a session by the student. For example, suppose one of the rules for safe operation of an a RCL with a belt pack is that you must be able to clearly see where both the front and rear of the locomotive and car-set your moving is at all times. The instructor would position (in the CGI world) a locomotive in such a way as to cause an obstructed view during the planned movement. The student violates the rule and moves the train behind a stationed locomotive. The system will identify the movement as a violation and create an exception accordingly. The instructor may have designated the event as a portion of a proficiency test and will deduct points accordingly.

As a review, the session can be played back and the "eye-point" can be changed to above the entire scene. Where the student would only have seen the train in his control move behind the stationed locomotive during the session, he will now see a locomotive engineer step off the blind side of the locomotive and be struck by the train under control of the student. This would offer a very powerful tool to demonstrate why rule compliance is so important.

The motion sensor 30 may be part of a virtual reality system, which is well-known in the game and other training industries. An example of implementation is illustrated in FIG. 6. A sensor 34 is provided on the operator to determine the direction that they are looking. This may be provided on the operator themselves or on the RCL controller 20, as illustrated in FIG. 6.

Alternatively, a sensor system 32 may be provided to monitor the position of the operator on a platform 36. The platform 36 may also be a series of pressure-sensitive elements used to determine the position and direction of the operator. As the operator moves on the platform 36, any of the systems will provide position and orientation signals to the computer 12, which then can adjust the display 14. To allow greater mobility of the operator and allow them to walk closer or further away from the train or along the train, a treadmill or large roller ball 38 may be provided. It is illustrated as a circular treadmill that will allow longitudinal motion, as well as angular positioning.

Besides training, the simulator may be used to test the RCL controller 20. This may include ergonomic studies, fatigue and other operator-related conditions, as well as system software errors.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A simulator that simulates a remote control locomotive system which system includes a portable remote control locomotive controller, the simulator comprising:
a display displaying a remote control locomotive controller with controls and a train on a track from an operator's perspective outside a locomotive cab;
a first input device having one or more of a keyboard, a mouse and a touch screen of a computer operated by an operator to control corresponding controls of the portable remote control locomotive controller on the display and to provide train signals; and
the computer driving the display to change the display of the train on the track from the operator's perspective outside a locomotive cab in response to the train signals.

2. The simulator according to claim 1, including an audio device driven by the computer.

3. The simulator according to claim 2, wherein the computer drives the audio device with one or more of machine sounds, environmental sounds and human sounds.

4. The simulator according to claim 1, wherein the simulator includes an atmospheric control system for simulating various atmospheric conditions.

5. The simulator according to claim 1, wherein the computer provides modified drive signals for simulating various atmospheric conditions on the display.

6. The simulator according to claim 1, wherein the computer includes alert conditions and determines when an alert condition results from the train signals.

7. The simulator according to claim 6, wherein the computer annunciates an alert for a determined alert condition.

8. The simulator according to claim 1, wherein the display, first input device and the computer are an integral portable unit.

9. The simulator according to claim 1, wherein the first input device and the computer are an integrated floor console.

10. The simulator according to claim 1, wherein the computer includes a data base of one or more of various locomotives, locations and atmospheric conditions for driving the display.

11. The simulator according to claim 1, wherein the computer includes a computer generated images system for driving the display.

12. A simulator that simulates a remote control locomotive system which includes a portable remote control locomotive controller, the simulator comprising:
a display;
a first input device having controls corresponding to controls of the portable remote control locomotive controller and operated by an operator to provide train signals;
a second input device sensing one or more of the conditions of position and orientation of the operator relative to the display and providing view signals in response to the sensed condition; and
a computer driving the display to change the display of a train on a track in response to the train signals and to change perspective of the train and the track in the display in response to the view signals.

13. The simulator according to claim 12, wherein the first input device is the remote control locomotive controller of a remote control locomotive system.

14. The simulator according to claim 12, wherein the computer drives the display to show the remote control locomotive controller, and the first input device is one or more of a keyboard, a mouse and a touch screen of the computer.

15. The simulator according to claim 12, wherein the input devices are coupled to the computer by one of a cable, radio waves, light waves or sound waves.

16. The simulator according to claim 12, wherein the second input device is mounted on the first input device.

17. The simulator according to claim 12, wherein the computer stores the train signals correlated with the display drives for later analysis.

18. The simulator according to claim 17, wherein the computer includes a computer generated images system for driving the display and which is correlated and stored with the train signals.

19. The simulator according to claim 18, wherein the computer includes a playback system to playback and display the stored train signals and computer generated images.

20. The simulator according to claim 19, wherein the playback system allows changing of the displayed perspective during playback.

21. The simulator according to claim 17, wherein the display includes humans and/or human sounds, which are stored and correlated with the train signals.

22. The simulator according to claim 21, including a sound recorder, and the computer stores operator verbal responses correlated with the train signals.

23. The simulator according to claim 17, wherein the computer includes an analysis system for analyzing the stored train signals and display drives.

24. The simulator according to claim 12, wherein the second input device is mounted on the operator.

25. A simulator that simulates a remote control locomotive system which includes a portable remote control locomotive controller, the simulator comprising:
a display:
a first input device having controls corresponding to controls of the portable remote control locomotive controller and operated by an operator to provide train signals;
a second input device, including a platform with sensors on which the operator stands, sensing one or more of the conditions of position and orientation of the operator and providing view signals in response to the sensed condition; and
a computer driving the display to change the display of a train on a track in response to the train signals and to change perspective of the train and track in the display in response to the view signals.

26. The simulator according to claim 25, wherein the platform includes a treadmill with sensors.

27. The simulator according to claim 25, wherein the platform is a motion platform driven by the computer.

* * * * *